July 6, 1965
M. W. BEVINS
3,193,765
PLURAL EXTENSIBLE POWER LINE VOLTAGE MEASUREMENT PROBES
WITH SPOOL MEANS FOR THE INTERCONNECTING CONDUCTOR
Filed Dec. 12, 1960
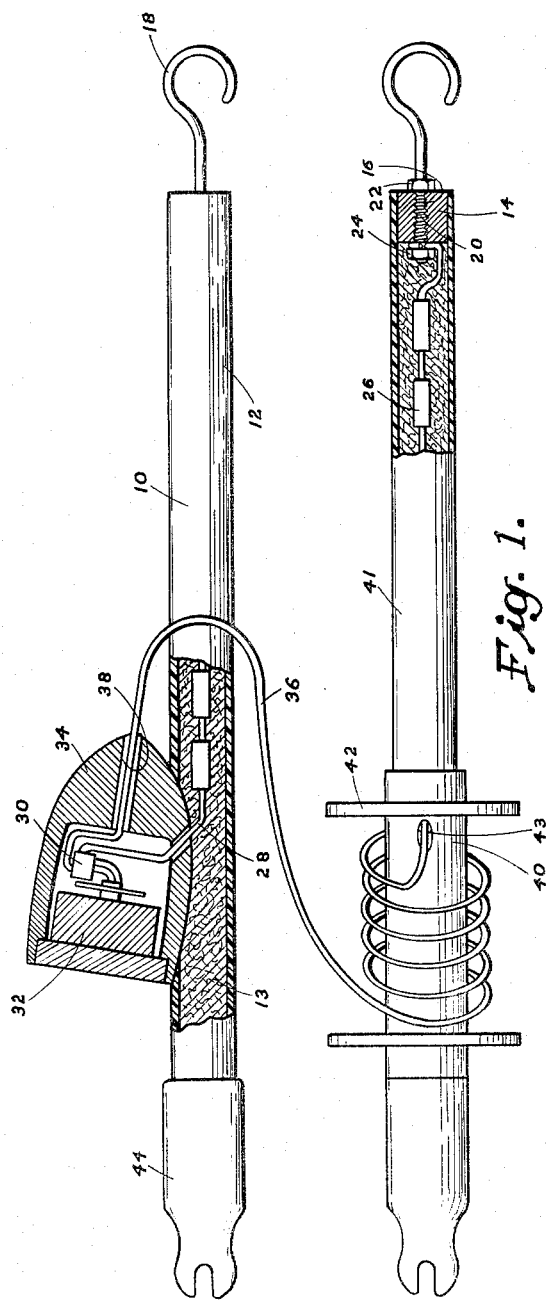
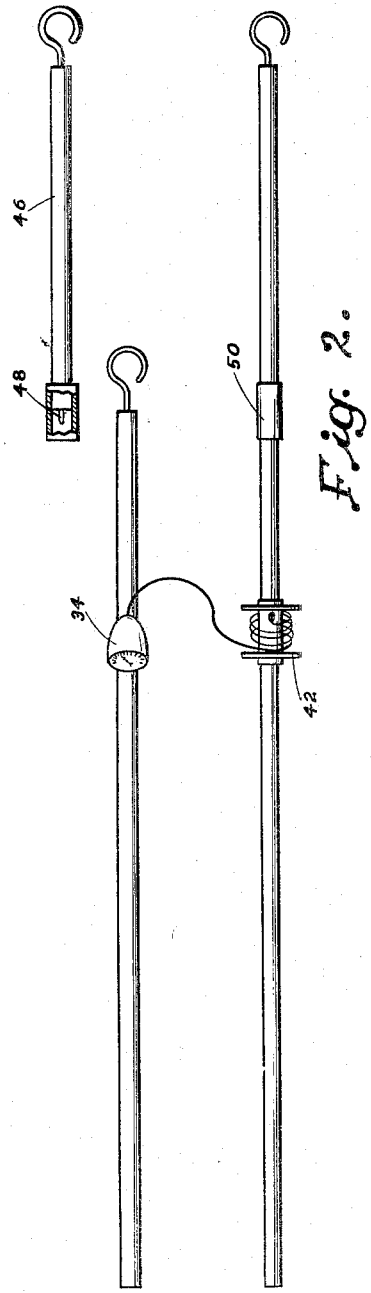
INVENTOR.
BY MARVIN W. BEVINS
ATTORNEY

United States Patent Office 3,193,765
Patented July 6, 1965

3,193,765
PLURAL EXTENSIBLE POWER LINE VOLTAGE MEASUREMENT PROBES WITH SPOOL MEANS FOR THE INTERCONNECTING CONDUCTOR
Marvin W. Bevins, 3137 S. Cincinnati, Tulsa, Okla.
Filed Dec. 12, 1960, Ser. No. 75,258
2 Claims. (Cl. 324—149)

This invention relates to improvements in phasing voltmeters, and more particularly, but not by way of limitation, to a phasing voltmeter specifically adapted for use by linemen on overhead high voltage electrical transmission lines.

In the transmission and distribution of electrical power, it frequently becomes necessary to connect one transmission or distribution system to another. An example of such an occasion is when a lead or leads of one line develop a fault so that it is necessary to connect thereto the corresponding lead or leads of another line in the same power system for supplying power to the load. However, it is absolutely essential for uninterrupted service of the customers that the leads so connected be of the same phase relation as those of the faulty lead or leads.

It is well known to provide phasing devices which utilize a neon lamp or the like electrically connected in a series electrical circuit that extends from a main staff to an auxiliary staff so that when conducting portions of the two staffs contact two adjacent high tension lines, and if a high voltage current is flowing through the lines, the neon lamp will be energized. These phasing devices are at times, however, not entirely indicative of the conditions represented thereby. When paralleling two electrical circuits, one of which is a heavily loaded line, there may be sufficient voltage difference therebetween to cause a neon lamp to indicate on the same phase due to line drop in the more heavily loaded line. Similarly, a neon lamp may indicate the same phase on a long line due to the phase angle between the same phases. Such errors are substantially precluded by use of the present novel and unique phasing device.

The present invention comprises a novel phasing device comprising a main staff having a voltmeter provided thereon and an auxiliary staff that is provided with a co-axial spool for receiving an insulated cable thereon which electrically connects the electrical portions of the main and auxiliary staffs in an electrical circuit. Both the main staff and the auxiliary staff are provided with resistors which are connected at one end to a conducting probe means, such as a shepherd's hook, for connection with an electrical transmission line and at the other end to the electrically insulated cable extending between the two staffs. Only the portion of the insulated cable is unwound from the spool positioned on the auxiliary staff as is absolutely needed for a quick and facile reading of the values indicated on the voltmeter, thereby minimizing distortion of the reading due to stray capacitance and precluding the cable from becoming entangled with either the linemen or their other necessary tools. The voltmeter positioned on the main staff is connected in a series circuit with the resistors carried within the main and auxiliary staffs and the conducting probe means.

The principal object of the present invention is to provide a novel phasing device for comparing the phases of an alternating current distribution system.

Another object of the present invention is to provide a novel phasing device for accurately determining the true voltages of a high tension electrical transmission line.

And still another object of the present invention is to provide a novel phasing device that may be coupled to appropriate extensions to extend the range of the phasing device and to permit the indication of higher electrical values and which is not burdened with added weight and bulk during normal use.

Still another object of the present invention is to provide a phasing device which minimizes the distortion of the indicated voltages that is due to stray capacitance.

And yet another object of the present invention is to provide a novel phasing device which permits control of the length of insulated conducting cable extending between the main and auxiliary portions of the device.

A still further object of the present invention is to provide a phasing device which promotes the maximum safety of the linemen operating the device on a pole.

And yet a still further object of this invention is to provide a novel phasing device which is simple in construction, durable in wear, and light enough for a facile handling by linemen on a pole.

Other objects and advantages of the invention will be evident from the following detailed description, read in conjunction with the accompanying drawings, which illustrate my invention.

In the drawings:

FIGURE 1 is a perspective view partially in cross section of a preferred embodiment of the novel invention.

FIGURE 2 is a perspective view partially in cross section which shows a modification of the invention and how extensions may be added to the device for extending the voltage range thereof.

Referring to the drawings in detail, reference character 10 generally designates a novel phasing device for indicating voltage values whereby the phasing of one electrical circuit to another may be facilitated. The phasing device 10 comprises a non-conducting cylindrical tubing 12 that is filled with a plastic foam 13 such as epoxy resin, or the like, for a reason that will be hereinafter set forth. The tubing 12, which may be designated as the main staff, is preferably constructed of a non-conducting plastic, such as epoxiglass or the like, although any other material possessing the necessary attributes, such as wood, would be suitable for use. A conducting terminal 14 provided with a central threaded bore 16 is secured in any suitable manner in an end of the main staff 12 which appears in FIG. 1 as the right hand end and which in actual use of the phasing device is the upper end of the phasing device 10. A conducting probe 18 of any suitable configuration, such as a shepherd's hook or the like, is provided with a threaded portion 20 that is threadedly secured within the terminal 14 and locked therein by means of a suitable lock nut 22 which is co-axially positioned on the outer periphery of the probe 18. It is to be understood that the form or shape of the electrode 18 and the specific method of attaching it to the tubing 12 is not limited to the precise form shown in the drawings, and it is within the scope of the invention to employ means other than those specifically shown in the drawings.

A suitable conducting nut 24 is positioned on the inner side of the terminal 14 for connection thereto of a plurality of resistors 26 which may be any well known type and comprise a pre-determined increment of resistance. These resistors may comprise a plurality of resistors linked in series or one continuous resistor. The resistors or resistor 26, as the case may be, extend through the interior of the tubing along the longitudinal axis thereof.

The resistors 26 are centrally positioned within the tubing by a suitable plastic foam, noted hereinbefore, which holds the resistors in a central position, acts as a cushioning non-conductive insulation to protect the resistors from any impacts encountered in normal usage of the device, and strengthens the tubing 12 against any transverse bending forces applied thereto. The resistors 26 extend longitudinally into the tubing 12 to a point where a suitable electrical lead 28 connected to the last resistor 26 extends transversely through an aperture in the wall of the tubing 12 for connection to a terminal of a suitable rectifier 30 for changing the alternating current flowing through the resistors into direct current for operation of the voltmeter in a manner well known in the art of electrical measurements.

A suitable D.-C. voltmeter 32 of any well known type is positioned within a non-conducting case 34 composed of wood or plastic, or the like, that is removably secured by any well known means (not shown) to the portion of the tubing 12 appearing on the left in the drawings, and in actual use comprising the lower end of the main staff of the tool 10. A suitable electrically insulated conductor 36 passes through a transversely extending bore 38 in the body of the voltmeter case for electrical connection to a terminal of the rectifier 30. The conductor 36 extends from the voltmeter case 34 attached to the main staff to a spool 40 preferably co-axially positioned by any well known means (not shown) on the left hand or lower portion of the auxiliary staff 41 which is constructed similarly to the main staff 12. The cylinder 40 is provided with a pair of spaced outwardly extending circumferential flanges 42 to provide a suitable channel shaped form for receiving the cable 36 wound therearound. Although the spool is shown in FIG. 1 as being solidly attached to the auxiliary staff 41, it is within scope of this invention to construct the spool 40 so that it is spring loaded and automatically winds up the portion of the cable that is not required for operation of the phasing device.

The cable 36 extends transversely through an aperture 43 in the wall of the auxiliary staff for connection to a resistance 26 in a manner similar to that previously set forth. The resistance 26 extends longitudinally through the auxiliary staff 41 for connection to a suitable probe or shepherd's hook 18, such as previously described. Thus, a series electrical circuit is provided for measuring the value of the voltage of an electrical transmission line to ground. This series electrical circuit extends from a probe 18 secured to the main staff, through the terminal 14 and resistances 26, lead 28, rectifier 30 of voltmeter 32, conductor 36 and similar resistances 26, terminal 14 and a probe 18 positioned in the auxiliary staff. The left hand end of the main and auxiliary staffs may be provided with appropriate fittings for connection of the main and auxiliary staffs to suitable non-conducting members or "hot sticks."

FIGURE 2 depicts a phasing device embodying a modification of the novel invention and also shows an additional structure which may be utilized to extend the range of the phasing device for operation with electrical transmission lines carrying a higher voltage. FIGURE 1 showed the novel phasing device as adapted for attachment to a pair of non-conducting members (not shown) for operation and use. However, as seen in FIG. 2, it is clearly within the purview of this invention to construct the main and auxiliary staffs so that the non-conducting members are an integral part of the main and auxiliary staffs.

FIGURE 2 also shows another feature which is an important portion of the main invention, namely that of providing a means for extending the effective range of the phasing device. Since the current flowing through an electrical circuit is inversly proportional to the amount of resistance encountered therein, it is necessary to increase the resistance in the electrical series circuit of the device 10 when it is desired to use the phasing device 10 to measure the voltage of an electrical transmission line which carries a voltage greater than that measured in normal use of the device. This is accomplished by unthreading the probes 18 from the terminals 14 and securing tubing extension 46 to the main and auxiliary staffs by means of a threaded bolt 48 that is secured in any well known manner within a terminal positioned in one end of the staff extension 46 similar to the structure previously set forth in the description of the main and auxiliary staffs. A non-conducting cylindrical collar 50 composed of plastic or a similar non-conducting material is positioned on an end of each of the extensions 46 adjacent to and overlapping said threaded members 48 to protect the threads of the bolts 48 when the extensions are not in use and to furnish additional strength against any transverse bending forces that might be applied to either end of the staff when the device is in use. The extensions 46 have threaded terminals 14 secured in the ends opposite from those protected by the collars 50. Additional potted resistors 26 are centrally positioned within said extensions 46 and extend longitudinally therethrough for electrical connection to the terminals 14 in a manner similar to that set forth in the description of the structure of the main and auxiliary staffs. These terminals 14 are identical with those used in the main and auxiliary staffs so that the staffs may then be threadedly positioned in the ends of the extensions for utilization of the novel phasing device 10.

*Operation*

For utilization of the novel phasing device 10, the main an auxiliary staffs 12 and 41, respectively, are removed from an appropriate carrying case (not shown) and selectively secured to non-conducting members or "hot sticks" by any suitable connections. The assembled staffs are then directed upwardly to the linemen on a pole by means of a hand line. Since safety regulations normally require two linemen to be used in the phasing of electrical transmission lines, the main staff 12 is grasped by one lineman and the auxiliary staff 41 is grasped by the other lineman. The insulated cnoductor 36 is unwound from the spool 40 positioned on the auxiliary staff 41 to permit the tool 10 to be easily handled and yet not allow the cable 36 to become entangled with either the safety belts of the linemen or the plurality of hand tools carried thereon. Linemen position themselves on wooden poles carrying overhead distribution lines by means of safety belts and hooks which are strapped to their legs. This position is precarious and dangerous at best and the novel device 10, by substantially precluding the chance of the cable 36 becoming entangled with either their safety belts or their hand tools, greatly increases the safety with which the phasing of high voltage transmission lines may be accomplished.

By closely controlling the degree to which the cable 36 may be draped downwardly during normal usage of the device, the distortion of the readings on the voltmeter 32 due to stray or ground capacitance may be minimized. This feature is apparent in that as the distance between the lowermost portion of the conductor 36 and the ground is increased, the capacitance that exists between the conductor 36 and the ground is lessened. The device 10 provides a novel structure for maintaining this distance at a maximum during operation of the device 10 and thereby substantially minimizing the distortion that is due to stray capacitance of the values indicated on the voltmeter 32.

The lineman holding the main staff 12 then positions the probe 18 against an uninsulated high voltage transmission line, or if the probe 18 comprises a shepherd's hook as shown in the drawings, merely hooks the shepherd"s hook over one of the transmission lines. A shepherd's hook may be preferable at times in that it allows a lineman to partially transfer the weight of the tool to the transmission line. The lineman holding the auxiliary staff 41 either touches or hooks the probe 18 over a ground wire so that the lineman holding the main staff may ascertain the voltage between that specific line and ground, and so phase the system in a conventional manner. After the distribution system has been connected to the power lines according to the correct phase relationship, the device 10 may be returned to the ground by a hand line and replaced in its carrying case.

When it is desired to ascertain the phase of a transmission system carrying a higher voltage than is generally measured in normal usage of the device 10, the main and auxiliary staffs are removed from a suitable carrying case (not shown) and the probes 18 are threadedly disengaged from the terminals 14 in both the main and auxiliary staffs respectively. The range extensions 46 are then secured to both the main and auxiliary staffs by screwing the bolts 48 carried by the extensions 46 into the threaded bores 16 provided in the terminals 14. The collars 50 are then seen to overlap a portion of the main and auxiliary staffs and the extensions 46 to further strengthen the joints between the staffs and the extensions against any transversely applied forces. The probes 18 are then repositioned in the oppositely disposed terminals 14 provided in the extensions 46 oppositely from the bolts 48 secured in like terminals 14. Thus, a pre-determined increment of resistance has been added to the series electrical measurement circuit to permit the device to be used for measurement of higher voltage values. A typical example of the invention uses a fifteen kilovolt limit for a normal range and extends the range of the device by use of the extensions 46 to a limit of seventy-five kilovolts. It is to be understood that the values set forth above do not limit in any manner the scope of the invention, but only represent typical values that may be utilized in the practice of the invention. The tool thus assembled is then sent up to the linemen on the pole by means of a hand line for utilization as previously set forth above.

From the foregoing, it is apparent that the present invention has provided a phasing device which carries a means for controlling the length of insulated cable connecting the main and auxiliary staffs of the device and thereby increasing the safety of the linemen using the device on a pole and minimizing the distortion of the readings of a voltmeter carried thereon by reducing the stray capacitance effecting the voltmeter. The novel invention also provides suitable extensions for connection to the auxiliary and main staffs of the phasing voltmeter apparatus whereby the effective range thereof may be safely increased without burdening the device with added weight and bulk during the normal usage thereof. Thus, a novel phasing device has been provided for safely and accurately determining the phase relationship of an electrical distribution system in order to connect another distribution system thereto.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In a device of the character described, a first non-conducting cylindrical staff member having a conducting probe means removably secured to one end thereof and adapted to be applied to a power lead, a voltage measurement means carried by said staff member and spaced from the probe means to facilitate visual inspection of the voltage measurement, said probe means being connected through an electrical resistance to one terminal of the voltage measurement means, a second non-conducting cylindrical staff member having a conducting probe means removably secured to one end thereof and adapted to be applied to a second power lead, said second probe means being connected to a second terminal of the voltage measurement means through an electrical resistance and an insulated conducting cable that extends between the voltage measurement means and the second probe means, spool means provided on one of said staff members to control the length of the conducting cable extending between the voltage measurement means and the second probe means, a third non-conducting cylindrical staff member adapted to be secured to the first staff member, said third staff member provided with an electrical resistance adapted to be electrically connected through said first electrical resistance to the voltage measurement means, the third staff member adapted to receive the first conducting probe means in one end, a fourth non-conducting cylindrical staff member adapted to be removably secured to the second staff member, said fourth staff member provided with an electrical resistance adapted to be electrically connected through the second electrical resistance to the other side of the voltage measurement means, and the fourth staff member adapted to receive the second conducting probe means in one end thereof.

2. In a device of the character described, a first non-conducting tubing member having a conducting electrode removably secured to one end thereof and adapted to be applied to a power lead, a voltage measurement means carried by said tubing member and spaced downwardly from the electrode for facilitating visual inspection of the voltage measurement, said electrode being connected through an electrical resistance to one side of the voltage measurement means, a second non-conducting tubing member having a conducting electrode removably secured to one end thereof and adapted to be applied to a second power lead, said second electrode being connected to the other side of the voltage measurement means through an electrical resistance and an insulated conducting cable that extends between the voltage measurement means and the second electrode, spool means provided on one of said tubing members to control the length of the conducting cable extending between the tubing members, a first non-conducting tubing extension member provided with an electrical resistance and adapted to be secured to the end of the first tubing member after the electrode has been removed, said electrode adapted to be removably secured to the tubing extension and electrically connected through the electrical resistance contained therein to the electrical resistance in the first tubing member, and a second tubing extension member identical to said first tubing extension member and adapted to be secured to the second tubing member.

References Cited by the Examiner

UNITED STATES PATENTS

| 2,269,225 | 1/42 | Rich | 324—149 |
| 2,546,093 | 3/51 | Gilbert | 324—149 |
| 2,552,981 | 5/51 | Lamb | 324—149 |

FOREIGN PATENTS

| 502,453 | 11/54 | Italy. |
| 971,524 | 2/59 | Germany. |

References Cited by the Applicant

UNITED STATES PATENTS

| 2,128,019 | 8/38 | Sleeper. |
| 2,375,591 | 5/45 | Schweitzer. |
| 2,779,919 | 1/57 | West. |
| 2,916,698 | 12/59 | Eisenberg et al. |

WALTER L. CARLSON, *Primary Examiner.*

ELI J. SAX, FREDERICK M. STRADER, *Examiners.*